(12) United States Patent
Baniecki et al.

(10) Patent No.: US 7,726,198 B2
(45) Date of Patent: Jun. 1, 2010

(54) STRAIN SENSOR

(75) Inventors: John D. Baniecki, Kawasaki (JP);
Takeshi Shioga, Kawasaki (JP);
Kazuaki Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/852,608

(22) Filed: Sep. 10, 2007

(65) Prior Publication Data

US 2008/0072684 A1 Mar. 27, 2008

(30) Foreign Application Priority Data

Sep. 26, 2006 (JP) .............................. 2006-261071

(51) Int. Cl.
*G01L 1/00* (2006.01)
(52) U.S. Cl. ....................................................... 73/780
(58) Field of Classification Search .................... 73/780; 257/296, 311; 428/469; 324/769
See application file for complete search history.

(56) References Cited

U.S. PATENT DOCUMENTS

| | | | | |
|---|---|---|---|---|
| 6,376,090 | B1 * | 4/2002 | Kijima | 428/469 |
| 6,974,985 | B2 * | 12/2005 | Kurasawa et al. | 257/296 |
| 7,245,526 | B2 * | 7/2007 | Oh et al. | 365/163 |
| 7,268,575 | B1 * | 9/2007 | Chen et al. | 324/769 |

FOREIGN PATENT DOCUMENTS

| | | | |
|---|---|---|---|
| JP | 60253750 A | 12/1985 | |
| JP | 62200544 A | 9/1987 | |

* cited by examiner

*Primary Examiner*—Jewel Thompson
(74) *Attorney, Agent, or Firm*—Westerman, Hattori, Daniels & Adrian, LLP

(57) ABSTRACT

A strain sensor comprises a capacitor formed on a substrate, the capacitor having a layered structure in which a lower electrode, a metal oxide film of perovskite structure and an upper electrode are laminated consecutively on the substrate, the capacitor being adapted to be mounted upon a specimen, and a measuring circuit that measures a leakage current flowing through the capacitor between the upper electrode and the lower electrode.

17 Claims, 9 Drawing Sheets

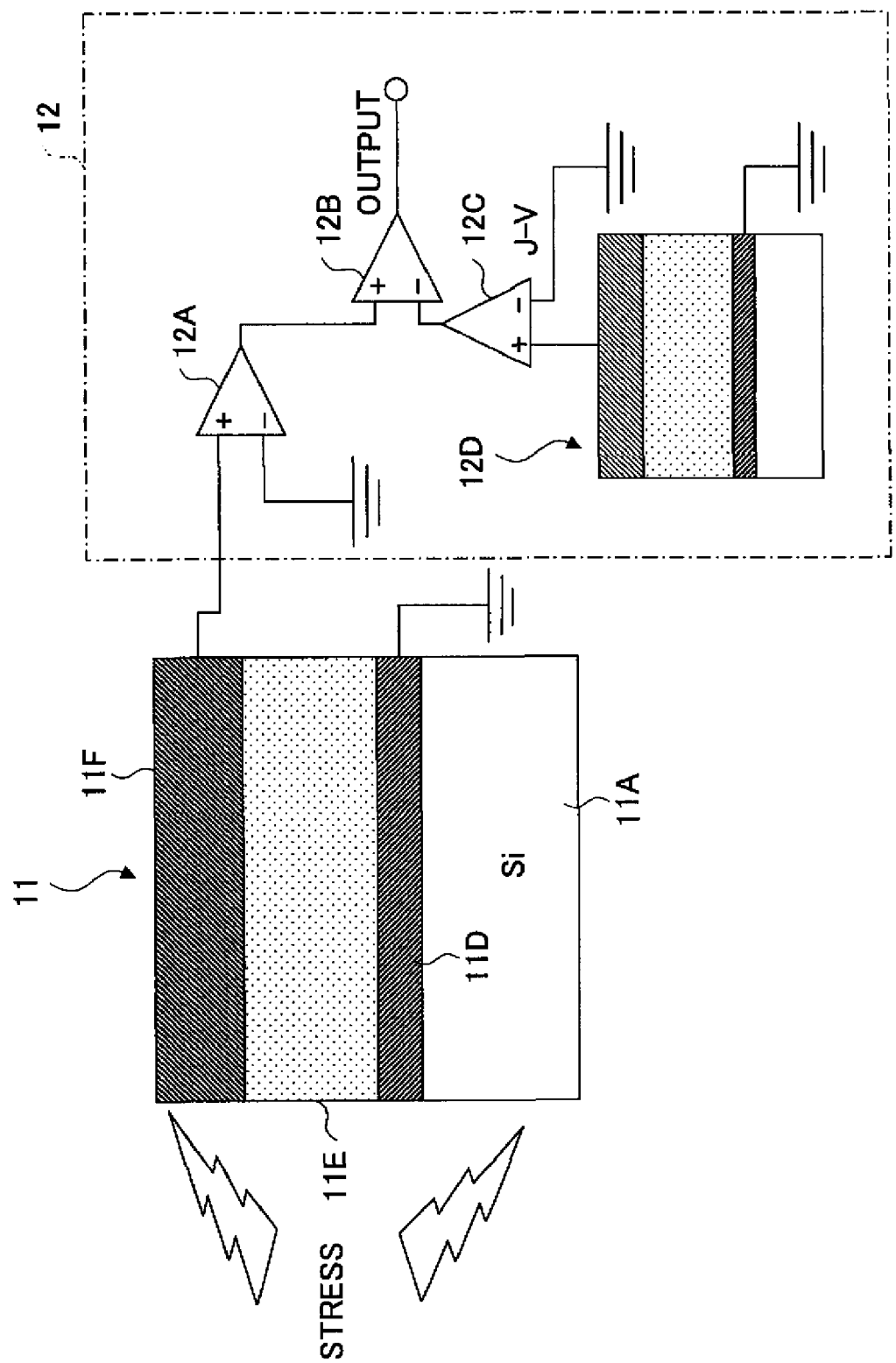

41

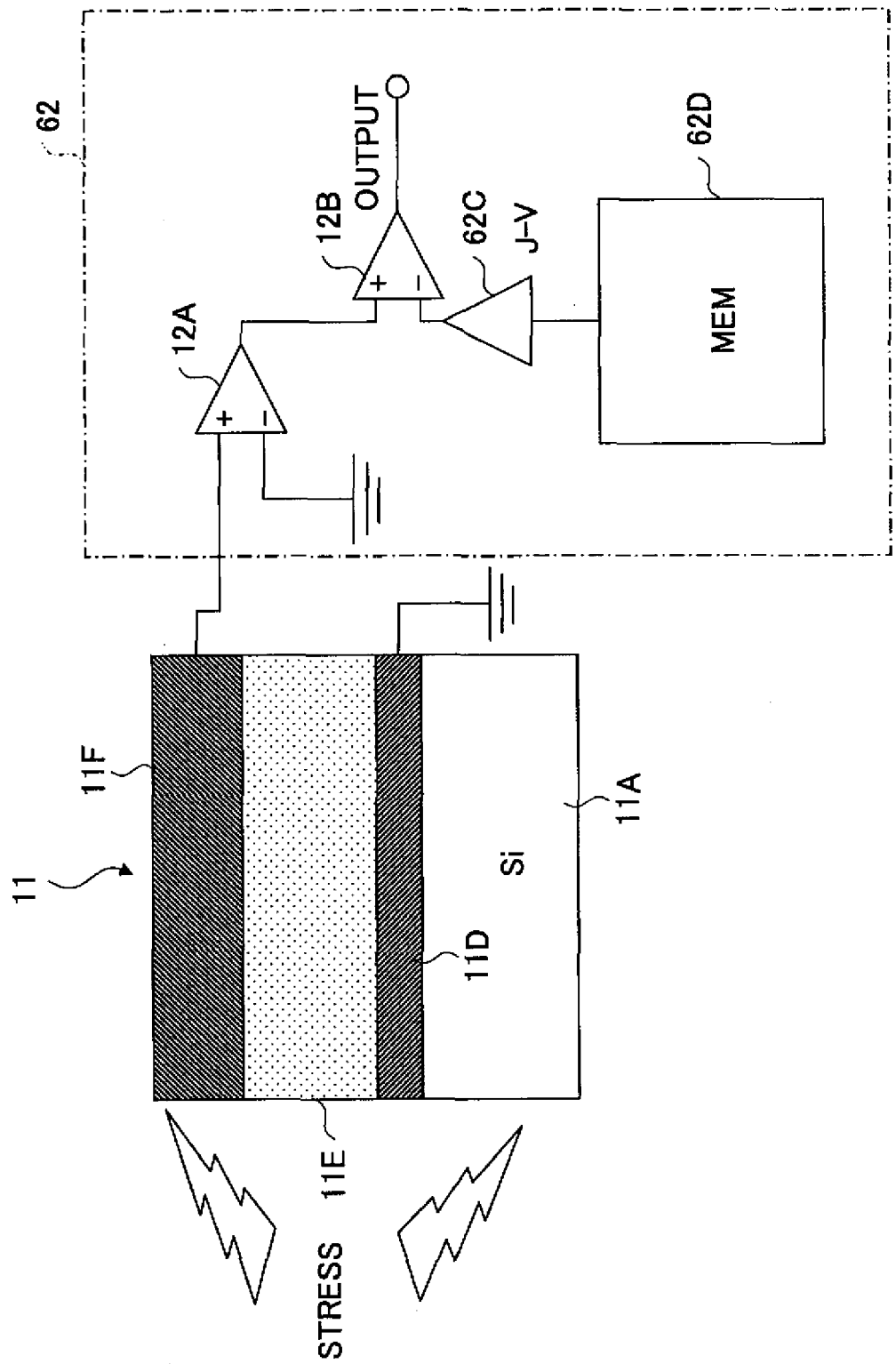

STRAIN SENSOR

CROSS-REFERENCE TO RELATED APPLICATION

The present application is based on Japanese priority application No. 2006-261071 filed on Sep. 26, 2006, the entire contents of which are hereby incorporated by reference.

BACKGROUND OF THE INVENTION

The present invention generally relates to mechano-electro conversion elements that convert a stress to an electric signal and more particularly to a highly miniaturized thin film strain sensor or stress sensor.

Strain sensors are used extensively for stress measurement, strain measurement, pressure measurement, or the like, in the field of automobiles, aircrafts, space vehicles, automatic control systems, medical appliances, pressure measuring devices, and the like. In these applications, there is a need of a compact and reliable strain sensor capable of measuring a stress in the range of 1 MPa-10 GPa.

Patent Reference 1
  Japanese Laid-Open Patent Application 60-253750

Patent Reference 2
  Japanese Laid-Open Patent Application 62-200544

Conventionally, various strain sensors are known, such as metal film strain sensor that uses a metal film for strain detection, optic strain sensor that detects strain by using photoelastic phenomenon, semiconductor strain sensor that uses semiconductor thin film for stress detection, and the like.

Among the foregoing, a metal film sensor has the problem of high cost and occupying large area. On the other hand, an optic strain sensor has high sensitivity and is thus capable of conducting high-precision measurement. However, an optic strain sensor is extremely fragile and occupies a large space, and applicability thereof to industry is limited. A semiconductor strain sensor has an advantage in that it can be manufactured with low cost as compared with the metal film strain sensor. However, with a semiconductor strain sensor, there are problems in that the operational temperature is limited or a temperature control is needed. Further, there are problems that the response is slow and needs a large area.

FIG. 1A shows an example of a metal film strain sensor according to a related art of the present invention.

Referring to FIG. 1A, a metal film 3 is attached on a specimen 1 subjected to the stress measurement via an adhesive layer 2, and the strain of the specimen 1 is calculated by measuring the resistance of the metal film 3 via terminals 3A and 3B.

With such a construction, there is a need of causing to flow an electric current through the metal film 3 in a direction parallel to the specimen 1, and thus, the strain sensor inevitably occupies a large area. Further, because a very thin metal film has to be attached, handling of the strain sensor is difficult, and there is further imposed various restrictions on the operational environment such as ambient, temperature, and the like.

FIG. 1B shows an example of a semiconductor strain sensor according to a related art of the present invention, wherein those parts corresponding to the parts explained previously are designated by the same reference numerals and the description thereof will be omitted.

Referring to FIG. 1B, a silicon chip 4 is attached to the specimen 1 via the adhesives layer 2, and the stress applied to the specimen 1 is calculated by measuring the resistance of the silicon chip 4 via terminals 4A and 4B.

On the other hand, while the semiconductor strain sensor of FIG. 1 can be manufactured with low cost and handled easily, there is a problem in that the semiconductor strain sensor occupies a large area on the specimen 1 similarly to the construction of FIG. 1A, and there is a further problem in that the operational environment such as ambient, temperature, and the like, is limited.

FIG. 1C shows a further example of the semiconductor strain sensor according to a related art of the present invention, wherein those parts corresponding to the parts explained previously are designated by the same reference numerals and the description thereof will be omitted.

In the example of FIG. 1C, a silicon oxide film 5 is deposited directly on the specimen 1 and a silicon film 6 is deposited directly on the silicon oxide film 5. Further, electrodes 6A and 6B are formed on the silicon film 6 for the purpose of resistance measurement.

Because the construction of FIG. 1C does not use an adhesives layer, and because the silicon film 6 is thin, it is possible, with the construction of FIG. 1C, to measure the resistance of the silicon film with high-precision under various conditions including high temperature environment.

On the other hand, such a construction requires vacuum process for the formation of the silicon oxide film 5 and the silicon film 6, and thus, the construction of FIG. 1C cannot be produced with low cost. Further, because of the use of the silicon film 6, there is imposed a limitation in terms of ambient similarly to the construction of the FIG. 1B, and the strain sensor of FIG. 1C cannot be used in high temperature oxidizing ambient. Further, because the resistance measurement is conducted parallel on the surface of the specimen similarly to the previous example, it is not possible with the construction of FIG. 1C to avoid the problem that that the strain sensor occupies a large area.

Further, FIG. 1D shows a construction in which there is formed a conductive diffusion region 7 in the specimen 1 and the resistance of the conductive diffusion region 7 is measured via terminals 7A and 7B.

Because no adhesive layer is used with the construction of FIG. 1D, the strain sensor of FIG. 1D can be used up to high temperatures. On the other hand, with the construction of FIG. 1D, there is imposed a limitation on the material that constitutes the specimen 1 in order to allow formation of the conductive diffusion region 7. More specifically, the specimen 1 has to be made of a semiconductor material such as Si. Further, formation of such a conductive diffusion region 7 requires processes such as ion implantation and thermal annealing process, and the cost of the strain sensor is increased inevitably. Further, even with the construction of FIG. 1D, the use of the strain sensor in the high temperature oxidizing ambient is limited similarly to the strain sensor of the FIG. 1C. Also, the problem that the strain sensor occupies large area on the specimen 1 is not avoided with the construction of FIG. 1D.

SUMMARY OF THE INVENTION

In one aspect, the present invention provides a strain sensor including:

a capacitor formed on a substrate, said capacitor having a layered structure in which a lower electrode, a metal oxide film of perovskite structure and an upper electrode are laminated consecutively on said substrate, said capacitor being adapted to be mounted upon a specimen; and a measuring circuit that measures a leakage current flowing through said capacitor between said upper electrode and said lower electrode.

BRIEF DESCRIPTION OF THE DRAWINGS

FIG. 2 is a diagram showing the construction of a strain sensor according to a first embodiment of the present invention;

FIG. 8 is a diagram showing the construction of a strain sensor according to a fourth embodiment of the present invention.

DETAILED DESCRIPTION OF THE INVENTION

FIG. 2 shows the construction of a strain sensor 10 according to a first embodiment of the present invention.

Referring to FIG. 2, the strain sensor 10 includes a ferroelectric capacitor 11 and a measuring circuit 12 cooperating with the ferroelectric capacitor 11, wherein the ferroelectric capacitor 11 is fixed upon a specimen via an adhesive in such a manner that the strain of the specimen induces a stress in the ferroelectric capacitor 11 in the thickness direction thereof, and the measuring circuit 12 measures the capacitor leakage current flowing through the ferroelectric capacitor 11.

Figure 3:
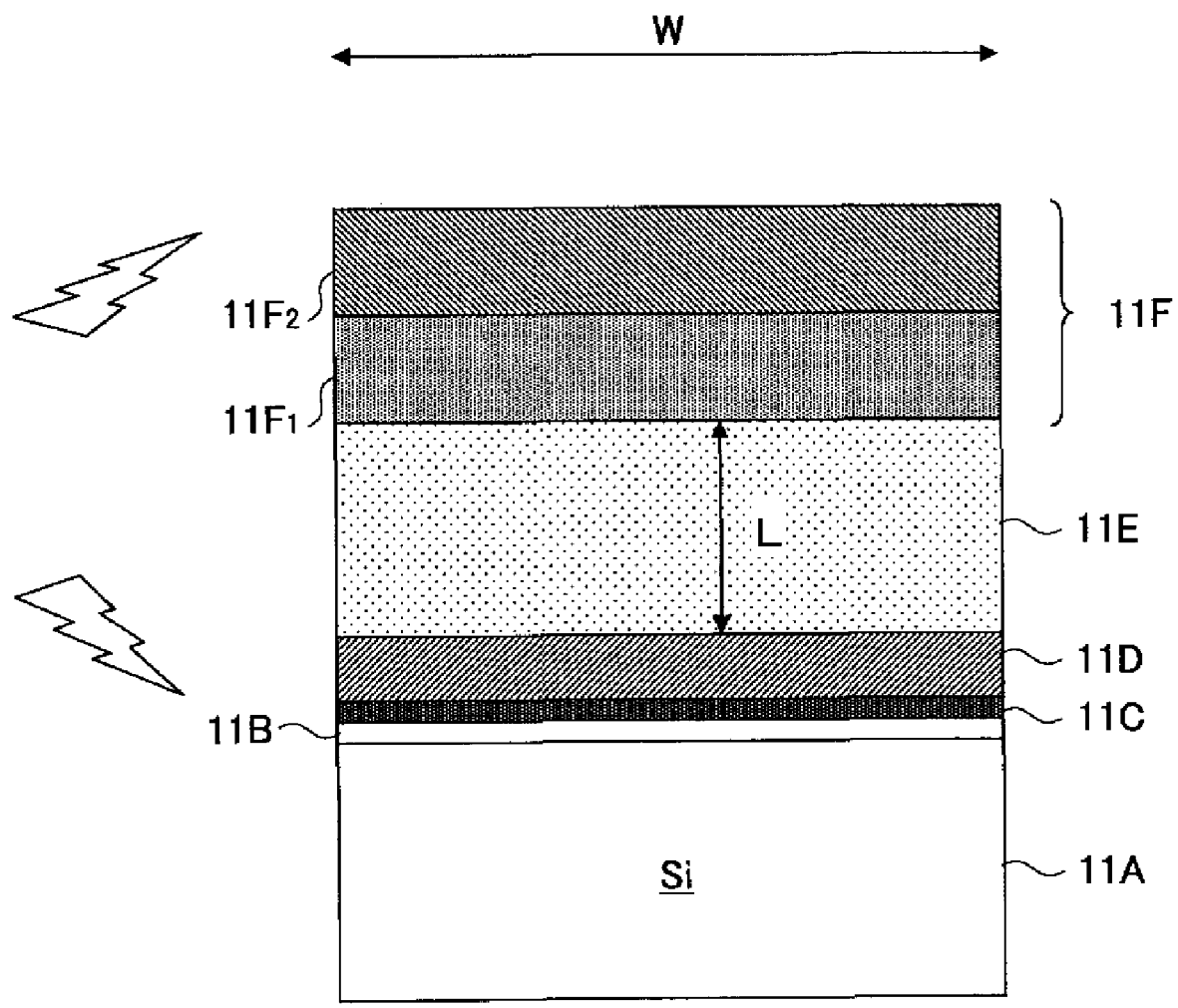
FIG. 3 is a diagram showing the construction of a capacitor used with the strain sensor of FIG. 2 in detail.

FIG. 3 shows the construction of the capacitor 11 of FIG. 2 in detail.

Referring to FIG. 3, there is formed a lower electrode 11D of Pt on a silicon substrate 11A with a thickness of 100 nm by a sputtering process via a thermal oxide film 11B and an adhesion layer 11C having a thickness of 2 nm, for example, wherein the adhesion layer 11C may formed of Ti or TiN. Further, there is formed a $(Ba,Sr)TiO_3$ film of perovskite structure on the lower electrode 11D by a sputtering process with a film thickness of 1-1000 nm, such as 100 nm in the illustrated example, as a capacitor insulation film.

Further, on the capacitor insulation film 11E, there is formed an upper electrode 11F, wherein the upper electrode 11F is formed of lamination of an $IrO_2$ film $11F_1$ formed with a thickness of 50 nm, for example, by a sputtering process, and an Au film $11F_2$ formed also with a thickness of 50 nm, for example, by a sputtering process.

The capacitor 11 is patterned to have a width W of 100 μm and stress is applied thereto in the film thickness direction as the capacitor 11 is attached to the specimen at a sidewall surface of the capacitor 11 by an adhesive. The strain sensor of the present invention measures the stress applied to the capacitor 11 in the thickness direction thereof by measuring the change of the leakage current between the lower electrode 11D and the upper electrode 11F by the measuring circuit 12.

Referring to FIG. 2 again, the lower electrode 11D of the capacitor 11 is grounded, and the measuring circuit 12 holds a separate, reference capacitor 12D of the construction identical to the capacitor 11, in the state free from strain. In the reference capacitor 12D, too, the lower electrode corresponding to the lower electrode 11D is grounded similarly.

In more detail, the measuring circuit 12 includes: an operational amplifier 12A having a grounded inverting input terminal and a non-inverting input terminal connected to the upper electrode 11F; an operational amplifier 12C having a grounded inverting input terminal and a non-inverting input terminal connected to the upper electrode of the reference capacitor 12D; and an operational amplifier 12B supplied with the output of the operational amplifier 12A at a non-inverting input terminal and supplied with the output of the operational amplifier 12C at an inverting input terminal, wherein the operational amplifier 12A measures the leakage current between the upper electrode 11F and the lower electrode 11D in the capacitor 11, while the operational amplifier 12C measures the leakage current between the upper electrode and lower electrode in the foregoing reference capacitor 12D.

Thus, in the measuring circuit of FIG. 2, the strain induced in the capacitor 11 is calculated by comparing the leakage current of the capacitor 11 with the leakage current of the reference capacitor 12D.

Figure 4:
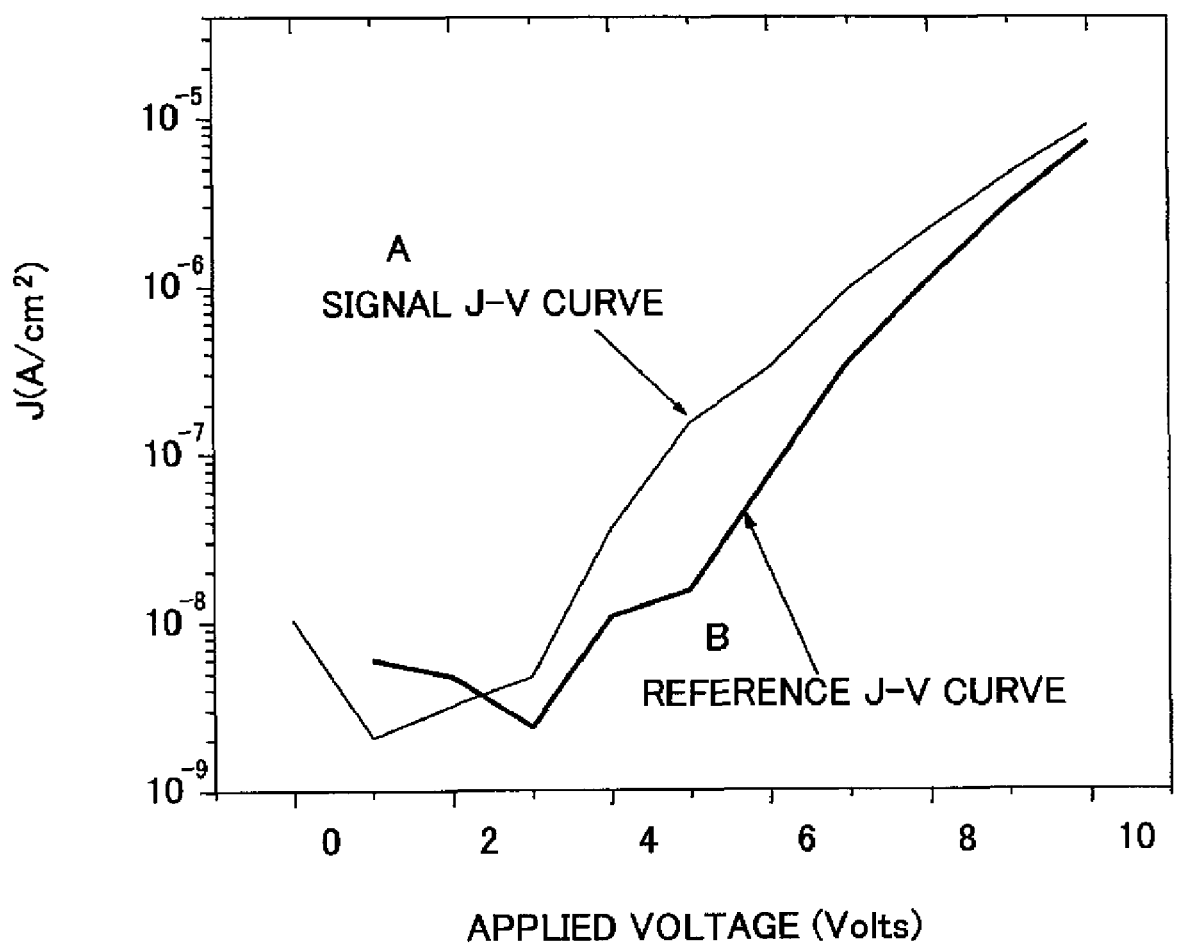
FIG. 4 is a diagram showing a leakage current characteristic of the capacitor used with the strain sensor of FIG. 2.

FIG. 4 shows the leakage current characteristic of the capacitors 11 and 12D, wherein the horizontal axis of FIG. 4 indicates the applied voltage between the upper electrode and the lower electrode for the respective capacitors, while vertical axis indicates a leakage current. Further, a line A of FIG. 4 represents the leakage current characteristic of the capacitor 11 in the state applied with the stress of 100 MPa, while a line B represents a leakage current characteristic of the reference capacitor 12D free from stress. It should be noted that the foregoing stress of 100 MPa corresponds to the strain of 0.1% of the capacitor 11, more specifically, the strain of the capacitor insulation film 11E.

Referring to FIG. 4, the leakage current increases with applied stress, while this reflects, although it depends on the applied voltage, the effect of decrease of interatomic distance caused as a result of the stressing.

Figure 5:
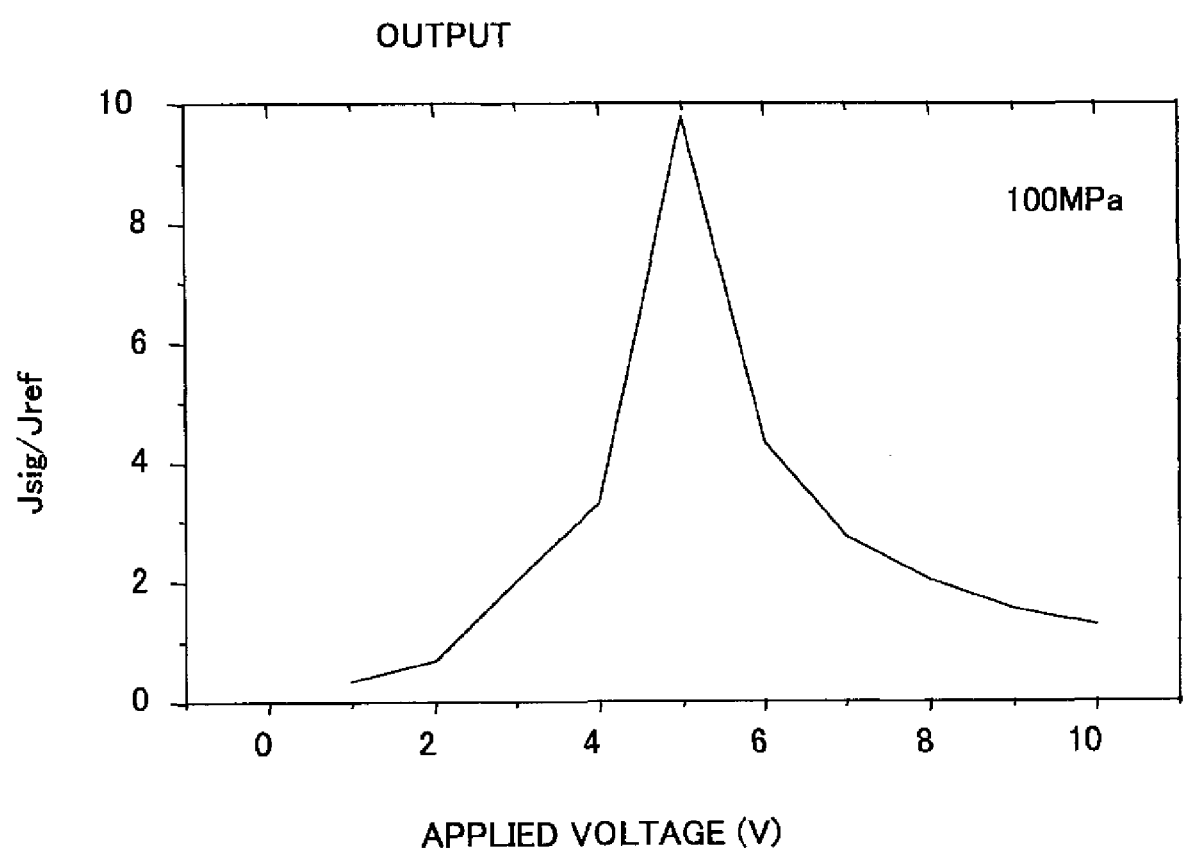
FIG. 5 is a diagram showing the change of leakage current characteristic caused with stressing in the capacitor of FIG. 4 as a function of applied voltage.

FIG. 5 is a diagram showing the leakage current Jsig for the line A to the leakage current Jref for the line B of FIG. 4, as a function of the applied voltage.

Referring to FIG. 5, it can be seen that the ratio Jsig/Jref becomes maximum and reaches 10 in the case the applied voltage is set to 5V.

Thus, with the strain sensor 10 of FIG. 2, it becomes possible to measure the stress applied to the capacitor 11 and the strain induced with such a stress, by using the capacitor 11 of FIG. 3 as the detector and by detecting the change of the leakage current caused by the application of the stress.

With such a strain sensor, a gauge factor GL is defined as $$GL = \Delta R/R/\Delta L/L,$$

wherein R represents the resistance of the capacitor, ΔR represents the resistance change caused by application of the stress, L represents the film thickness of the capacitor insulation film 11E shown in FIG. 3, and ΔL represents the change of the film thickness caused by stress application. The larger the gauge factor GL is, the larger the resistance change caused by the strain and thus, the larger the change of the leakage current.

In the present invention, the inventor of the present invention has discovered that, with the capacitor 11 that uses the capacitor insulation film 11D of $(Ba,Sr)TiO_3$, the gauge factor reaches the value of −900.

Figure 1A:
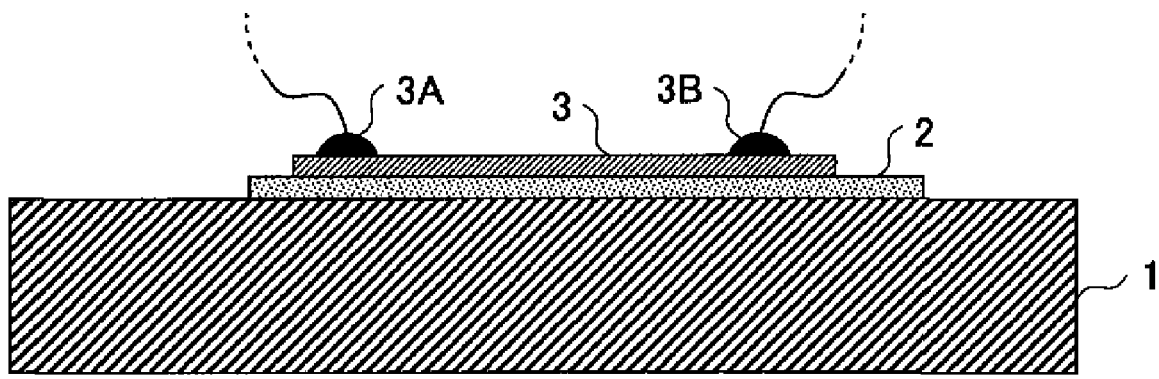
FIG. 1A is a diagram showing the construction of a strain sensor according to a related art of the present invention.
Figure 1B:
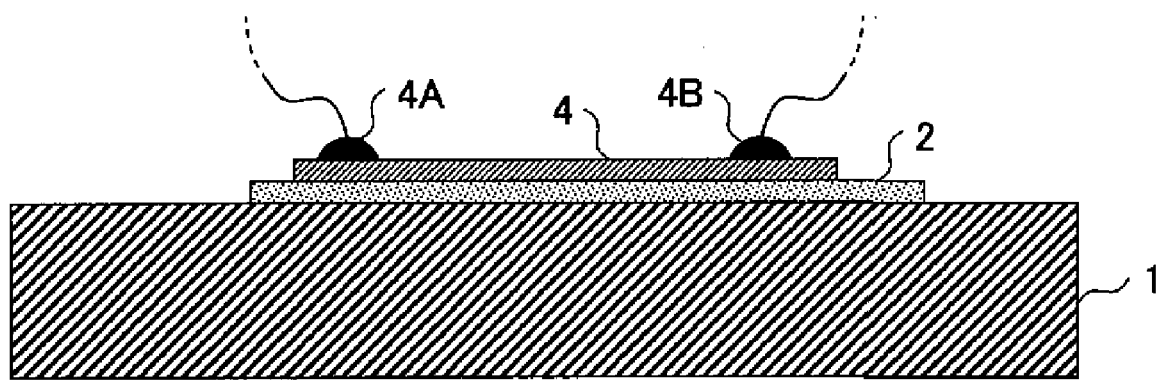
FIG. 1B is a diagram showing the construction of a strain sensor according to another related art of the present invention.
Figure 1C:
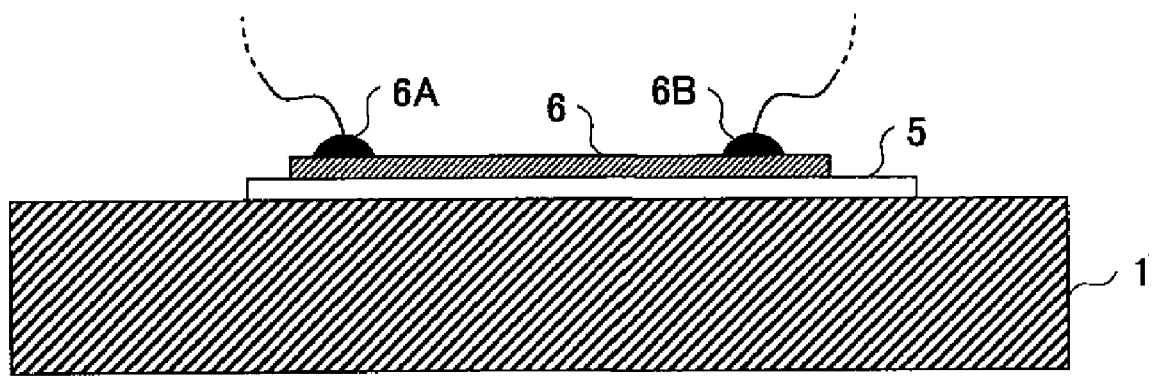
FIG. 1C is a diagram showing the construction of a strain sensor according to a further related art of the present invention.
Figure 1D:
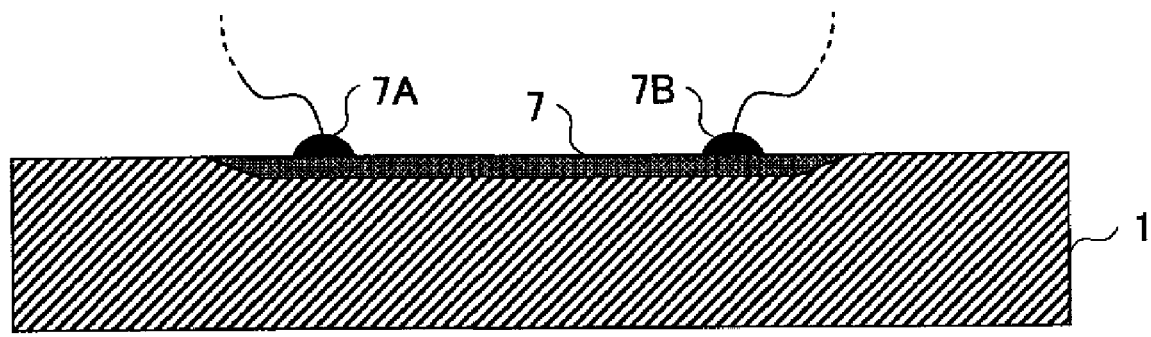
FIG. 1D is a diagram showing the construction of a strain sensor according to a further related art of the present invention.

In the case of the stress (strain) sensor that uses a metal film explained with reference to FIG. 1A, on the other hand, the gauge factor is only 2. Further, with the case of the semiconductor stress (strain) sensor explained with reference to FIGS. 1B-1D, the value of the gauge factor remains in the range of −50--200.

Thus, in contrast to the conventional construction in which there has been the need of providing the strain sensor to cover a large area of the specimen as shown in FIGS. 1A-1D for obtaining the stress or strain with satisfactory precision, the strain sensor of the present invention is operable in the stress region of 1 MPa-10 GPa and enables measurement of stress or strain even in the case the strain sensor is provided on the small region of the size of 1 μm or less.

Because the strain sensor of the present embodiment uses a $(Ba,Sr)TiO_3$ film for the capacitor insulation film 11E, the strain sensor of the present invention is operable in various environments including high temperature oxidizing ambient.

In the example of FIG. 3, it will be noted that the capacitor is formed on the silicon substrate 11, while the silicon substrate 11 does not constitute a part of the measuring circuit, and thus, there is caused no influence on the measurement result even in the case that the silicon substrate surface undergoes oxidation.

Figure 6:
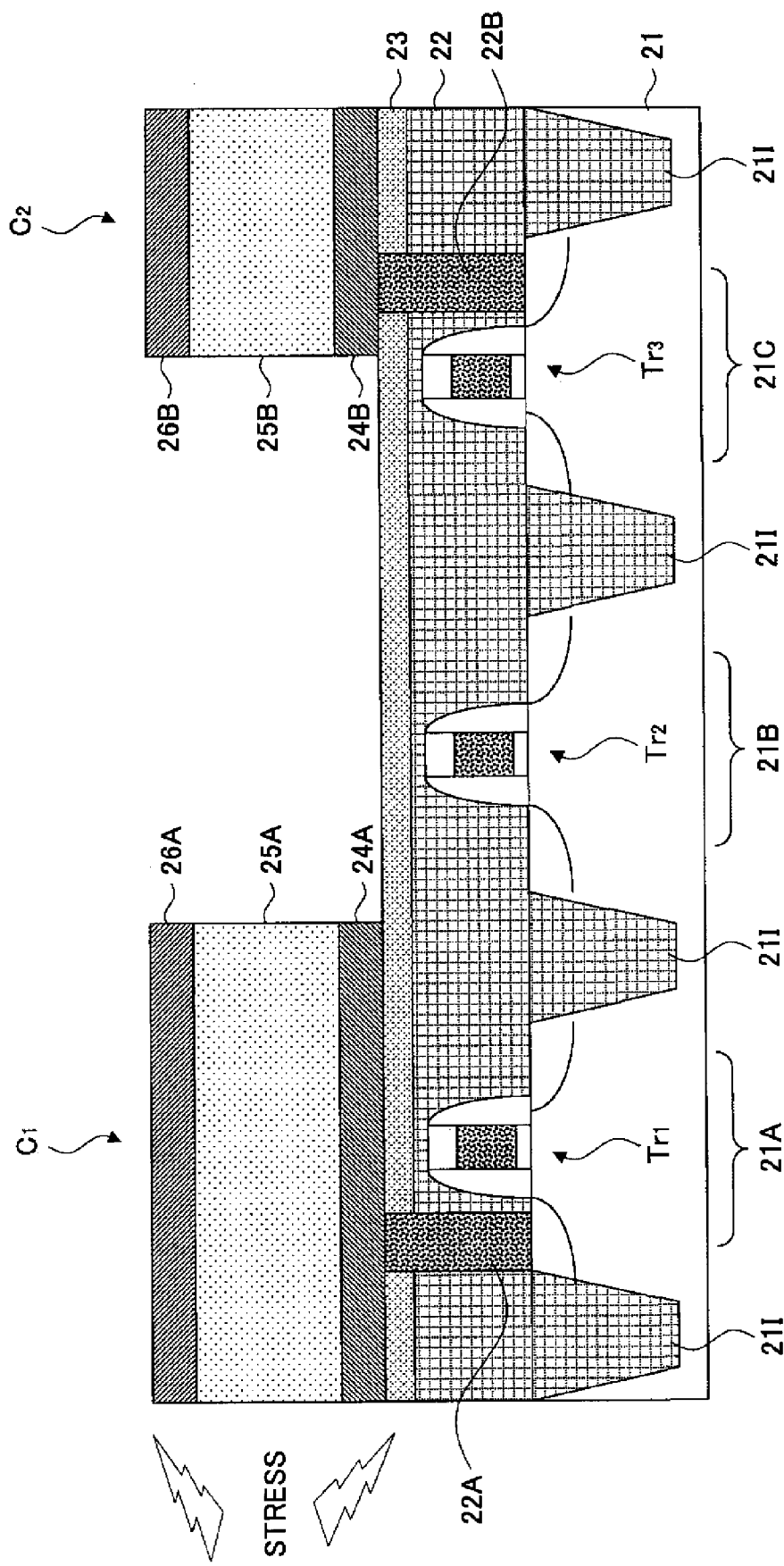
FIG. 6 is a diagram showing the construction of a strain sensor according to a second embodiment of the present invention.

FIG. 6 shows the construction of a strain sensor 20 according to a second embodiment of the present invention.

Referring to FIG. 6, the strain sensor 20 is formed on a silicon substrate 21 defined with device regions 21A, 21B and 21C by a device isolation region 21I, wherein the device regions 21A, 21B and 21C are formed with transistors Tr1, Tr2 and Tr3 constituting a part of a measuring circuit similar to the measuring circuit 12 of FIG. 2.

The transistors Tr1, Tr2 and Tr3 are covered by an interlayer insulation film 22 of a silicon oxide film, and an SiN film 23 is formed further on the silicon oxide film 22 as an oxygen barrier layer.

Further, on the SiN film 23, there is formed a capacitor C1 used for the strain sensor on the device region 21A by consecutively forming a lower electrode 24A of Pt, a capacitor insulation film 25A of $(Ba,Sr)TiO_3$, and an upper electrode 26A of Pt. Further, it will be noted that a reference capacitor C2 is formed on the device region 21C such that the device region has an identical layered structure to the capacitor C1 by consecutively forming a lower electrode 24B, a capacitor insulation film 25B and an upper electrode 26B.

Thereby, it should be noted that, in the capacitor C1, the lower electrode 24A is connected to the source region of the transistor Tr1 via a plug 22A penetrating through the interlayer insulation film 22. Similarly, in the capacitor C2, the lower electrode 24B is connected to the source region of the transistor Tr3 via a plug 22B penetrating through the interlayer insulation film 22.

Thus, by fixing the strain sensor 20 of FIG. 6 on a specimen such that the sidewall surface of the capacitor C1 makes contact with the measuring region of the specimen by way of adhesive or the like, it becomes possible to measure the strain induced in the specimen with high precision, similarly to the previous embodiment.

Because the capacitor C1 and the measuring circuit are integrated on the silicon substrate 21 with the construction of FIG. 6, the strain sensor 20 can be handled easily.

With the construction of FIG. 6, it should be noted that the capacitors C1 and C2 having metal oxide film are formed over the interlayer insulation film above the SiN film 23. Thus, the problem of deterioration of characteristics of the transistors Tr1-Tr3 by the penetration of oxygen gas ambient used at the time of formation of the capacitors C1 and C2 into the interlayer insulation film 22 is avoided successfully.

In FIG. 6, it should be noted that illustration of the multilayer interconnection structure formed on the capacitors C1 and C2 is omitted.

Figure 7:
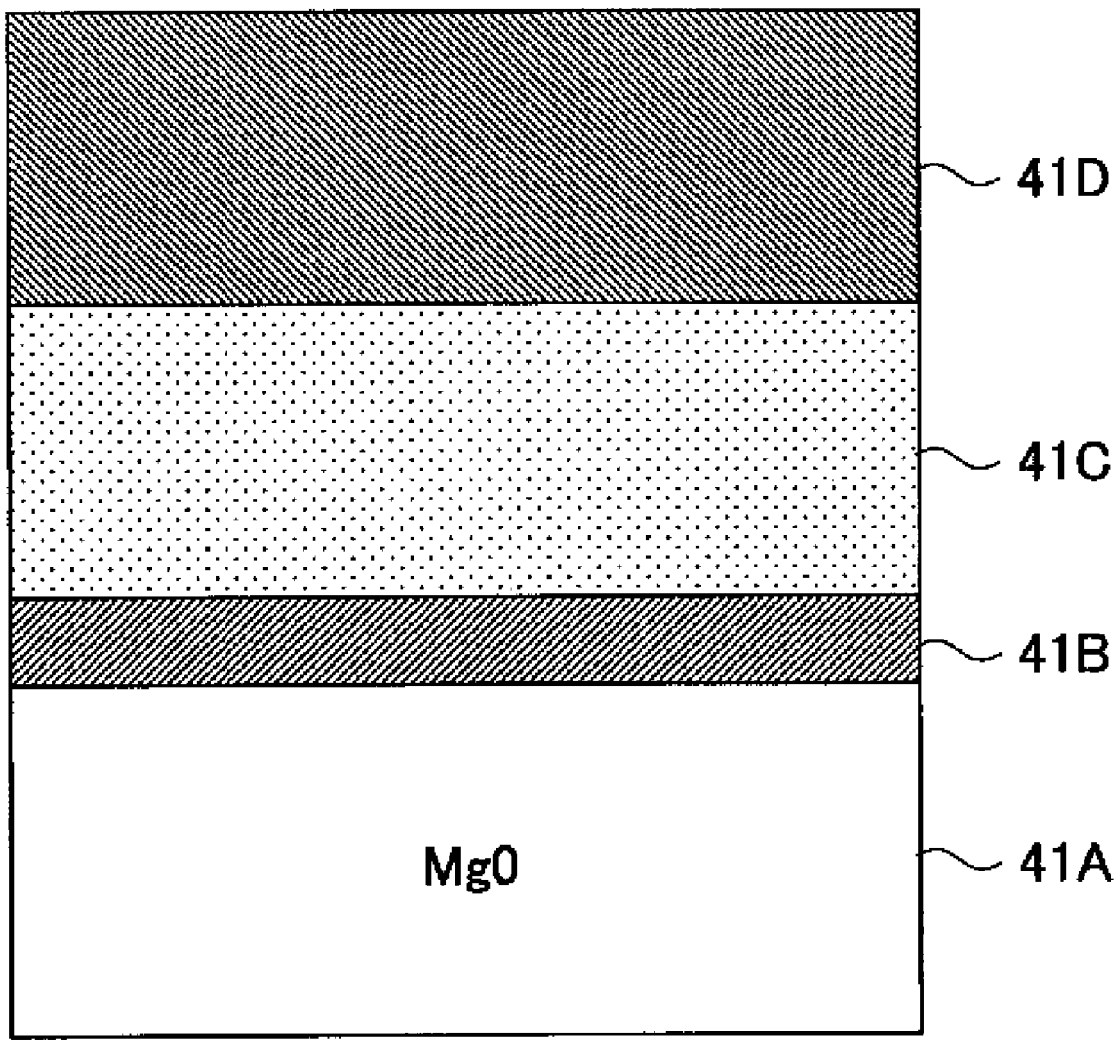
FIG. 7 is a diagram showing the construction of a capacitor according to a third embodiment of the present invention.

FIG. 7 shows the construction of a capacitor 41 according to a third embodiment of the present invention, wherein it should be noted that the capacitor 41 of the present embodiment replaces the capacitor 11 in the strain sensor 10 of FIG. 2.

Referring to FIG. 7, the capacitor 21 is formed on a MgO single crystal substrate 21A and includes: a lower electrode 21B of Pt formed on the substrate 21A by a sputtering process with a thickness of 50 nm; a $(Ba,Sr)TiO_3$ film 41C formed on the lower electrode 21B by a sputtering process with a film thickness of 100 nm; and an upper electrode 41D of Pt formed on the $(Ba,Sr)TiO_3$ film 41C by a sputtering process with the film thickness of 100 nm.

Further, with the present embodiment, it should be noted that the reference capacitor 12D of the measuring circuit 12 is formed such that the capacitor insulation film thereof has the same composition and same thickness to the $(Ba, Sr)TiO_3$ film 41C.

With the present embodiment, it becomes possible to carry out the strain detection by using the reference leakage current characteristics explained with FIG. 4 similarly to the previous embodiment even in the case the capacitor used for detector is formed on a separate substrate such as a MgO substrate, by setting the composition and film thickness of the capacitor insulation film of the reference capacitor equal to the composition and film thickness of the capacitor insulation film of the capacitor 41 used for the detector. With the present embodiment, it should be noted that the substrate 41A does not constitute a part of the measuring circuit. Further, while it is preferable to form the lower electrode 41B and upper electrode 41D to have the same composition and thickness to the lower electrode and upper electrode of the reference capacitor, these electrode layers have inherently low resistance and there is caused no large error in the measured strain even when there is a difference in composition or thickness as compared to the reference capacitor.

Because the substrate is formed of an oxide with the construction of the present embodiment, resistance of the capacitor 41 to high temperature oxidizing ambient is improved further.

FIG. 7 shows the construction of a strain sensor 60 according to a fourth embodiment of the present invention, wherein those parts of the drawing explained previously are designated by the same reference numerals and the description thereof will be omitted.

Referring to FIG. 7, the present embodiment uses a measuring circuit 62 in place of the measuring circuit 12, wherein it should be noted that the measuring circuit 62 lacks the reference capacitor 12D but uses a memory 62D holding the reference leakage current characteristic of FIG. 4 in place thereof.

Thus, the reference leakage current characteristic is read out from the memory 62D via a reading circuit 62C and is supplied to the inverting input terminal of the operational amplifier 12B.

With such a construction, there is no need of forming a capacitor in the measuring circuit, and the construction of the measuring circuit is simplified.

While it has been explained that the measuring circuit 12 or 62 is formed by an analog circuit, it is of course possible to construct the measuring circuit 12 or 62 with a digital circuit.

For the memory 62D, it is possible to use a non-volatile flash memory or a ferroelectric memory (FeRAM).

With the present invention, it should be noted that the capacitor insulation film of the perovskite type metal oxide is not restricted to the film thickness of 100 nm but may have a thickness of 1-1000 nm.

Here, the metal oxide film has a composition represented by a general formula $ABO_{3-x}$ in correspondence to the perovskite structure, wherein it is possible to use cations of monovalent to trivalent positive electric charges such as Pb for the cation A, in addition to Ba and Sr. For the cation B, one or more of the cations selected from the group of Ti, Zr, Hf, V, Nb, Ta, Cr, Mo, W, Mn, Re, Cu, Ag, and Au may be used. For example, the metal oxide film may be any of lithium tantalate, barium titanate, strontium titanate, barium strontium titanate, bismuth titanate, strontium bismuth titanate, strontium bismuth niobate, strontium bismuth tantalate niobate, lead zirconate titanate, lead lanthanum zirconate titanate, potassium niobate, and lead magnesium niobate.

Further, for the substrate on which the capacitor is formed, it is possible to use an oxide substrate or a semiconductor substrate. For the oxide substrate, it is possible to use a MgO substrate, while for the semiconductor substrate, it is possible to use a substrate of Si, Ge, a SiGe mixed crystal and also a group III-V compound semiconductor substrate.

For the lower electrode, it is possible to use a metal or conductive oxide containing at least one of Pt, Pd, Ir, Ru, Rh, Re, and Os. Further, it is possible to use a metal containing at least one of Cu, Ag and Au.

Further, the adhesion layer provided between the substrate and the lower electrode is not limited to Ti or TiN but it is possible to use any of Pt, Ir, Zr, Ti, TiOx, PtOx, ZrOx, TiN, TiAlN, TaN, and TaSiN.

For the upper electrode, it is possible to use a metal or conductive oxide containing at least one of Pt, Pd, Ir, Ru, Rh and Re or a metal that contains at least one of Au, Ag, Cu, Ni, and Cr.

Further, the upper electrode may have a multilayer structure.

While the present invention has been explained heretofore for preferred embodiments, the present invention is by no means limited to the embodiments described but various variations and modifications may be made without departing from the scope of the invention.

What is claimed is:

1. A strain sensor comprising:
    a capacitor formed on a substrate, said capacitor having a layered structure in which a lower electrode, a metal oxide film of perovskite structure and an upper electrode are laminated consecutively on said substrate, said capacitor being adapted to be mounted upon a specimen, which applies a stress to said capacitor in a thickness direction thereof; and
    a measuring circuit that measures a leakage current flowing through said capacitor to which said stress is applied between said upper electrode and said lower electrode.

2. The strain sensor as claimed in claim 1, wherein said metal oxide film has a film thickness of 1-1000 nm.

3. The strain sensor as claimed in claim 1, wherein said metal oxide film has a composition represented by a general formula $ABO_{3-x}$, wherein A is at least one cation of monovalent to trivalent positive electric charge, while B is at least one cation selected from the group consisting of Ti, Zr, Hf, V, Nb, Ta, Cr, Mo, W, Mn, Re, Cu, Ag and Au.

4. The strain sensor as claimed in claim 1, wherein said metal oxide film comprises any of lithium tantalate, barium titanate, strontium titanate, barium strontium titanate, bismuth titanate, strontium bismuth titanate, strontium bismuth niobate, strontium bismuth tantalate niobate, lead zirconate titanate, lead lanthanum zirconate titanate, potassium niobate and lead magnesium niobate.

5. The strain sensor as claimed in claim 1, wherein said substrate is formed of an oxide or semiconductor.

6. The strain sensor as claimed in claim 5, wherein said semiconductor is any of Si, Ge, a SiGe mixed crystal and a group III-V semiconductor.

7. The strain sensor as claimed in claim 1, wherein said lower electrode comprises a metal or a conductive oxide containing at least one of Pt, Pd, Ir, Ru, Rh, Re and Os.

8. The strain sensor as claimed in claim 1, wherein said lower electrode comprises a metal containing at least one of Cu, Ag and Au.

9. The strain sensor as claimed in claim 1, wherein there is provided an adhesion layer of any of Pt, Ir, Zr, Ti, TiOx, PtOx, ZrOx, TiN, TiAlN, TaN and TaSiN between said substrate and said lower electrode.

10. The strain sensor as claimed in claim 1, wherein said upper electrode comprises a metal or a conductive oxide containing at least one of Pt, Pd, Ir, Ru, Rh and Re.

11. The strain sensor as claimed in claim 1, wherein said upper electrode comprises a metal containing at least one of Au, Ag, Cu, Ni and Cr.

12. The strain sensor as claimed in claim 1, wherein said upper electrode has a multilayer structure.

13. The strain sensor as claimed in claim 1, wherein said measuring circuit has a reference capacitor having a metal oxide film of perovskite structure with an identical composition and identical thickness to said metal oxide film in said capacitor, said measuring circuit calculates a strain caused in said capacitor by comparing said leakage current with a leakage current in said referent capacitor.

14. The strain sensor as claimed in claim 1, wherein said measuring circuit includes a memory holding a value of leakage current in a stress-free state of said capacitor in the form of date.

15. The strain sensor as claimed in claim 1, wherein said measuring circuit is formed on another substrate different from said substrate.

16. The strain sensor as claimed in claim 1, wherein said measuring circuit is integrated on said substrate together with said capacitor.

17. The strain as claimed in claim 1, wherein said capacitor is attached to a specimen at a sidewall surface of said capacitor by an adhesive.

* * * * *